Oct. 4, 1938.   M. KLEIN ET AL   2,132,168
VEHICLE COMPASS
Filed Aug. 31, 1935   2 Sheets-Sheet 1

Inventor
Maximilian Klein
Bernhard Willach
William Stader

Strauch & Hoffman
Attorneys

Oct. 4, 1938.  M. KLEIN ET AL  2,132,168
VEHICLE COMPASS
Filed Aug. 31, 1935   2 Sheets-Sheet 2
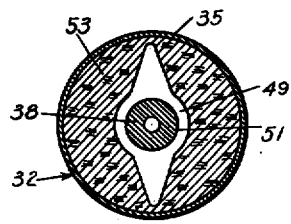
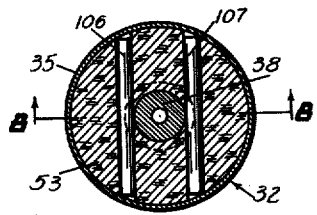
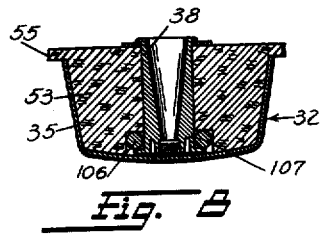
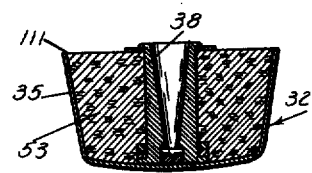
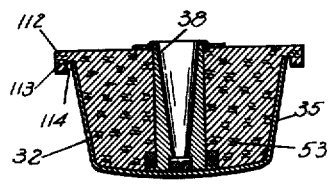
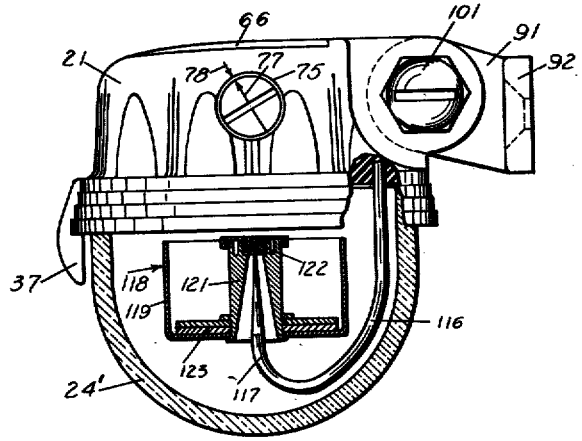
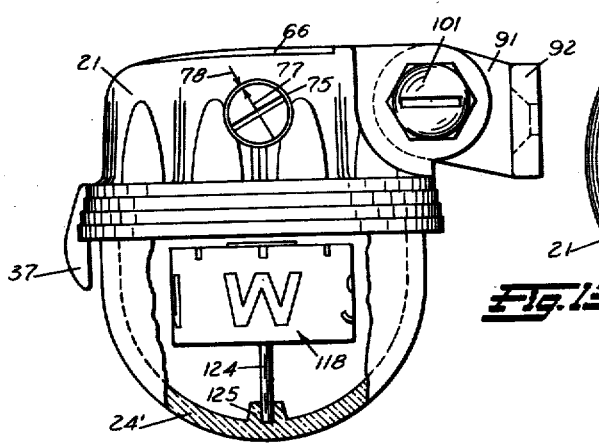
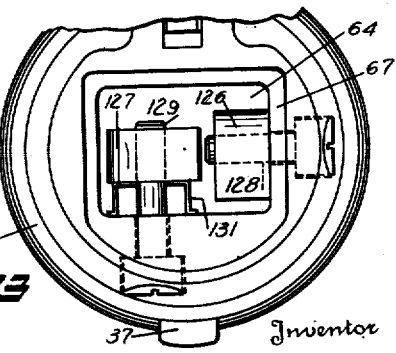
Inventor
Maximilian Klein
Bernhard Willach
William Stader
By Strauch & Hoffman
Attorneys Patented Oct. 4, 1938

2,132,168

UNITED STATES PATENT OFFICE 2,132,168

VEHICLE COMPASS

Maximilian Klein and Bernhard Willach, Sellersville, and William Stader, Perkasie, Pa., assignors to United States Gauge Company, Sellersville, Pa., a corporation of Pennsylvania Application August 31, 1935, Serial No. 38,814

11 Claims. (Cl. 33—223)

The present invention relates to improvements in magnetic compasses and more particularly is concerned with improvements in compasses which are designed for use in automobiles or other vehicles.

This invention has for its primary purpose the provision of a unitary magnetic compass capable of being successfully used in an automobile or like vehicle of such nature that stray magnetic fields are likely to be present in most parts of the vehicle, because of the inclusion as a part of the unitary construction of adjustable compensator means to counteract said fields.

A further object of the present invention resides in the provision of a vehicle compass which is accurately responsive to the earth's magnetic field.

This invention also aims to provide a vehicle or like compass, the indicating element of which is buoyantly sustained in the compass casing in a simple manner.

A further object of the invention is to provide a vehicle or like compass that may be constructed and assembled at low cost, but that will successfully withstand shocks incident to vehicle operation without permanently effecting the operation thereof.

A still further object of the invention resides in the provision of a compass which may conveniently be adjusted to compensate for the influence of stray magnetic fields so as to be capable of installation at any desired point of an automobile.

Still another object resides in the provision of a compass having indicia which are uniformly magnified in an extremely simple way regardless of the point of observation and which may be observed from any point about the compass dial.

Further objects of the invention will appear in the following detailed description and the appended claims when considered in conjunction with the accompanying drawings in which:

Figure 6 is a view partly in section and partly in elevation taken substantially along line 6—6 of Figure 4 and showing the dial cup and magnet forming a part of the preferred form of our invention.

Figure 7 is a view similar to Figure 6 showing a modified form of magnet construction.

Figure 8 is a sectional view taken substantially along line 8—8 of Figure 7.

Figure 9 is a view similar to Figure 8 illustrating a modified form of dial cup construction.

Figure 10 is a view similar to Figure 8 illustrating a further modified form of dial cup construction.

Figure 11 is a view similar to Figure 4 illustrating a modified form of pivot pin and dial cup.

Figure 12 is a view similar to Figure 11 illustrating a further modified form of pivot pin, and Figure 13 is a view similar to Figure 1 showing an alternate arrangement of the compensating magnets forming a part of the invention.

Figure 1:
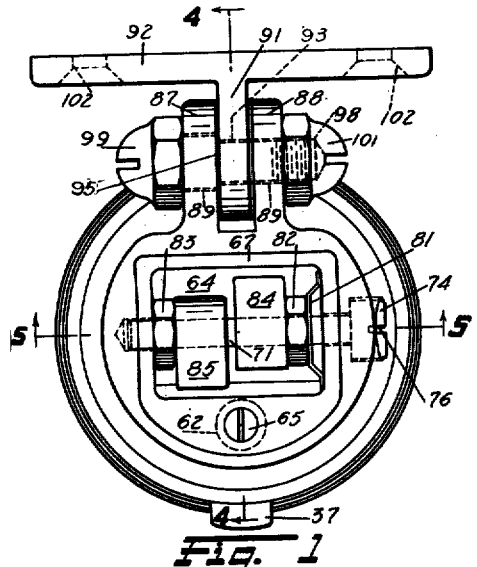
Figure 1 is a top plan view of a preferred embodiment of our invention with the cover of the compensator chamber removed for clarity of illustration.

With continued reference to the drawings in which like reference characters are employed to denote like parts throughout the several views, the preferred embodiment of our invention includes a substantially cylindrical housing section 21, formed of Bakelite or other suitable non-magnetic material, and having a depending annular flange 22 provided with internal threads 23. Secured in threaded engagement with flange 22 of housing section 21 is a bowl shaped section 24 formed of glass or other transparent and non-magnetic material. A fluid seal between housing section 21 and bowl section 24 is effected by means of a gasket 25 disposed adjacent threads 23.

Mounted in housing section 21 and depending centrally into bowl 24 is a needle shaped pivot 28 having a point 29. Disposed concentrically in bowl section 24 and immersed in a liquid bath 31 which fills the bowl, is a float assembly 32 which is horizontally supported in rotatable engagement with the point 29 of pivot 28. Liquid bath 31 is preferably formed from paraffin oil or other similar product.

Float assembly 32 comprises a dial cup 35 preferably formed of molded celluloid or like material, and positioned with its open end adjacent housing section 21. The external surface of dial cup 35 is provided with suitable graduated indicia 36 designed to register with a stationary index finger or lip 37 depending from housing section 21 outside of bowl 24. A core member 38 formed of relatively light weight material and concentrically disposed within dial cup 35, is provided at one end with a flange 39 which is secured in the bottom of dial cup 35 in any suitable manner, as for example by means of glue or other adhesive material.

Core 38 is provided with a tapered bore 41, which narrows toward the end of the core. Said core is cured in dial cup 35 and is enlarged adjacent the bottom of the dial cup to provide a recess 42 within which is confined a bearing member 43 formed of any suitable anti-friction material. A slight conical depression 44, formed in bearing 43, is adapted to accommodate the pivot point 29 in a manner presently to be described.

Supported in core 38 in the bottom of dial cup 35 is a laminated or similar bar magnet 46 having an enlarged central portion 49 (Figure 6) provided with an aperture 51 for accommodating core 38. Disposed within the space between core 38 and the walls of dial cup 35 is a filler 53, preferably of cork, which may be secured to the core and dial cup by glue or other suitable adhesive material. Cork filler 53 thus completely overlies and encloses bar magnet 46 and serves to assure buoyancy of the float assembly.

Cork filler 53 is provided above the top of dial cup 35 with a laterally extending flange 55 which increases the buoyance of the float assembly 32 and further tends to dampen excessive vibration or oscillation of the float assembly in the liquid bath. A washer 56, which bears against the top of cork filler 53 is disposed concentrically about core 38 and is locked in place by the top of core 38 which is peened outwardly as indicated at 57. The exposed surfaces of cork filler 53 are preferably covered with a coating of shellac or other suitable impervious and non-corrosive material.

The dial float assembly 32 is thus completely protected from the action of liquid bath 31 since dial cup 35 is molded from non-corrosive celluloid or like material, and cork filler 53 is coated with shellac or other corrosive resistant material. If desired, indicia 36 formed on the dial cup may be treated with radium to increase the use of the compass for night driving. The radium under such conditions may be coated with a protecting substance to prevent harmful action of the liquid bath on the indicia.

When the compass is assembled bore 41 of the dial float is designed to accommodate pivot 28, the point 29 of which is adapted to be received in conical depression 44 of the dial float bearing 43. The dial float is thus adapted to turn upon pivot 28 as bar magnet 46 responds to the influence of the earth's magnetic field. Furthermore, as bore 41 is of substantially greater diameter than needle pivot 28 therein accommodated, it will be seen that the dial float assembly may rock to a slight degree with respect to pivot 28. Therefore should pivot 28 assume a position slightly inclined to the vertical, dial float 32 will be free to remain in a substantially horizontal position by rocking slightly with respect to the pivot.

Provided in the bottom of housing section 21 adjacent bowl 24 is an annular groove 58 filled by an air bubble 59 and acting as an expansive chamber to allow expansion of the liquid bath 31 under variations in temperature and relieve the pressures created by such expansion.

Figure 5:
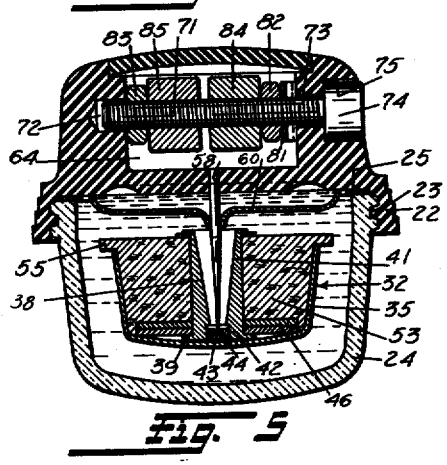
Figure 5 is a view in section taken substantially along line 5—5 of Figure 1.
Figure 5A:
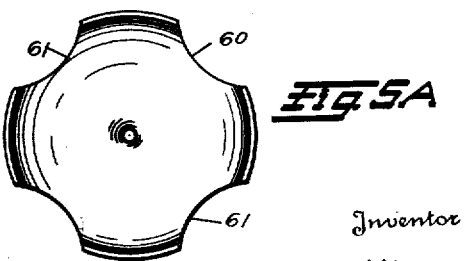
Figure 5A is a top plan view illustrating the baffle plate forming a part of the invention shown in Figures 4 and 5.

Disposed concentrically about pivot 28 between float assembly 32 and annular groove 58 is a cup-shaped baffle plate 60 having a scalloped periphery as indicated at 61 (Figure 5A). Baffle plate 60 serves to confine the air bubble 59 within groove 58 and to prevent the air bubble from shifting its position into the region adjacent the float assembly when the compass is subjected to shocks and jars such as may be occasioned by travel of a vehicle over rough roads. Such confinement of the air bubble 59 is desirable since it is found in practice that shifting of the air bubble into the region adjacent the float assembly tends to increase the undesirable vibration and oscillation which the float assembly suffers in responding to the influence of the earth's magnetic field. It will be appreciated, therefore, that provision of baffle plate 60 is effective to facilitate accurate and steady registration of the float assembly. It is to be understood, however, that baffle plate 60 may be omitted from the construction embodying our invention without departing from the spirit of the invention or restricting the scope thereof.

Embedded longitudinally in cylindrical housing section 21 is a tubular member 62 provided with a threaded bore 63 which at one end is in communication with groove 59 and at its other end is in communication with a compensating chamber 64 which is formed in housing section 21 and which may be opened to the atmosphere. Disposed in bore 63 adjacent groove 61 is a removable threaded plug 65. The top of compensating chamber 64 which is open to the atmosphere is designed to be closed by means of a cover 66 fitted in a recess 67 in the housing section and secured in place by a screw 68 removably threaded into one end of bore 63.

It will be seen that upon removal of screw 68 and cover 66, and withdrawal of plug 65, bore 63 will provide direct communication between the interior of bowl 24 and the exterior of the compass housing. Under such circumstances liquid may be readily introduced through bore 63 to bowl 24 either for initial filling of the bowl with the fluid bath or to subsequently replenish the bath. Upon replacement of plug 65 in the bore, bowl 24 is again provided with a fluid tight seal. Cover 66 and retaining screw 68 may then be replaced.

The compensating device designed to neutralize the effect of stray mangetic fields existing in the region of the bar magnet 46 will now be described. Extending transversely through compensating chamber 64 is a threaded bolt 71, one end of which is loosely received in a bore 72 formed in the chamber wall and the other end of which extends loosely through an aligned bore 73 and is provided with an enlarged head 74 which loosely fits within an enlarged portion 75 of bore 73. Head 74 of bolt 71 is provided with a kerf 76 for accommodating a suitable tool to adjust the angular position of the bolt. Head 74 is further provided with an index mark 77 designed to register with a mark 78 formed in the housing section 21 to indicate the neutral position of the magnets.

Disposed about the end of bolt 71 adjacent head 74 is a resilient bridge member 81 the legs of which are designed to bear against the wall of chamber 64. Dual nuts 82 and 83 are threaded upon bolt 71 in abutting relation with bridge member 81 and the opposite wall of chamber 64 respectively. It will be appreciated that nuts 82 and 83 thus serve to prevent longitudinal reciprocation of bolt 71 which is loosely fitted in housing section 21, and bridge member 81 serves to prevent binding of the nuts with the chamber walls thus preventing the bolt from becoming locked against angular adjustment.

Threaded on bolt 71 within chamber 64 and abutting nuts 82 and 83 respectively are twin compensating horseshoe magnets 84 and 85 which are preferably disposed with their open ends in diametric opposition. Compensating magnets 84 and 85 are respectively locked, by means of nuts 82 and 83, for rotation with bolt 71. Therefore, upon rotational adjustment of bolt 71, compensating magnets 84 and 85 may be selectively disposed in any desired angular position with respect to housing section 21 to effectively neutralize the effect of stray magnetic fields in the region of bar magnet 46.

If desired compensating magnets 84 and 85 may be selectively adjusted with their open ends in any desired angular relation with respect to each other by removing cover 65 of the compensating chamber and manually adjusting the magnets upon bolt 71. However, in practical use it is found preferable to initially adjust the magnets with their open ends diametrically opposed and to retain this adjustment at all times regardless of the angular position of bolt 71 with respect to housing section 21.

Preferably, in each magnet the south seeking pole is disposed below the north seeking pole, although such arrangement of the poles may be varied as required by particular magnetic conditions.

The construction for mounting the compass to the form of a vehicle will now be described. Housing section 21 is provided with dual spaced ears 87 and 88 having aligned apertures 89. Disposed between ears 87 and 88 is the stem 91 of a T-shaped bracket 92. Bracket stem 91 is provided with an aperture 93 aligned with ear apertures 89, and is further provided with radial knurls 94 on the face of the stem adjacent housing gear 88. A gasket member 95, formed of paper or other suitable friction material, and provided with a central aperture, is positioned between knurled face 94 of the bracket stem and ear 88.

A bolt 98, having a head 99 bearing against ear 87, is disposed within the aligned apertures in housing ears 87 and 88, bracket stem 91 and gasket 95, and is retained in position by means of a nut 101 threaded on the end of the bolt into abutment with housing ear 88. It will be seen, when nut 101 is turned home upon bolt 98, that bracket stem 91 will be firmly clamped between housing ears 87 and 88, friction gasket 95 under such conditions serving to prevent movement of the compass housing with respect to the bracket. Selective angular adjustment of the compass housing with respect to the bracket may be readily effected upon loosening of nut 101.

Bracket 92 is provided with apertures 102 for accommodating suitable bolts (not shown) by means of which the bracket may be secured with respect to the windshield header or dashboard of a conventional vehicle. Regardless of the position assumed by bracket 92 when mounted upon the vehicle frame, compass housing 21 may be selectively adjusted, in the manner previously described to insure substantially horizontal positioning of the compass housing.

If desired, compass housing 21 may be secured with respect to a vehicle housing by means of a suction cup or other suitable structure in lieu of the bracket 92 described in connection with the preferred embodiment of our invention.

From the structure thus far described, it will be appreciated that when the compass is completely assembled and, with the housing disposed substantially horizontally, is placed under the influence of the earth's magnetic field, dial float assembly 32 will turn around in fluid bath 31 until bar magnet 46 is properly aligned in the earth's magnetic field. The indicia 36 on the dial cup will under such conditions register with index finger 37 in the compass housing to indicate the direction in which the compass housing and bracket are faced. However, accurate indication of the compass under such conditions will occur only when the compass is isolated from the influence of stray magnetic fields and compensating magnets 84 and 85 are horizontally disposed at which time index mark 77 on the head of the compensating bolt will register with index mark 78 on the compass housing.

When the compass is secured to the frame of an automobile, however, stray magnetic fields created by the automobile will influence the compass and render reaction thereof to the earth's magnetic field inaccurate. In order to neutralize the effect of such stray fields the compensating magnets may be adjusted and the compass assembled in a vehicle in the following manner:

The true points of the compass are first ascertained by isolating the compass from the influence of stray fields which may be effected by removing the compass at least 20 feet from the car or any steel construction. The vehicle in which the compass is to be mounted is then faced in a known direction, preferably east or west, and the compass is tentatively positioned in several different locations adjacent the header of the windshield or the dashboard until a position is found in which the compass registers with a minimum declination from known true direction. The vehicle is then faced in the opposite direction and the process repeated. The compass is then mounted upon the vehicle at the point which affords least inaccuracy of registration.

An adjusting tool is next inserted in kerf 76 provided in the head of the compensating bolt and the bolt is rotated until the compass gives an accurate registration of the known direction in which the vehicle is faced. The compass will now give an accurate registration of any direction in which the vehicle may be faced.

Index mark 77 on the head of the compensating bolt will under such conditions be displaced from registration with index mark 78 in the compass housing, and the magnitude of such displacement will afford an indication of the angular position of the compensating magnets within the chamber 64.

The compensating magnets serve to neutralize stray magnetic fields which tend to influence bar magnet 46 in the following manner: When the compensating magnets are horizontally disposed, they create a magnetic field which is substantially balanced with respect to the bar magnet 46 of the compass, and which therefore has no effect upon the operation of the compass. However, when the compensating magnets are rotated together with the compensating bolt into a tilted or non-horizontal position, a compensating field is created which is unbalanced with respect to the bar magnet 46. By proper adjustment of the compensating magnets the resulting unbalanced compensating field may be regulated to exactly counteract and neutralize the effect of stray magnetic fields adjacent the bar magnet 46. The bar magnet under such conditions is influenced only by the earth's magnetic field and accurate registration and direction indications result.

In Figures 7 and 8 is shown an alternate arrangement of the magnetic unit forming a part of the dial cup assembly. This arrangement utilizes twin bar magnets 106 and 107 disposed in parallel relation on opposite sides of core member 38 in lieu of the single bar magnet 46 described in connection with the preferred form of my invention. Twin magnets 106 and 107, which are preferably cylindrical in shape, are disposed with their like poles adjacent.

Figure 4:
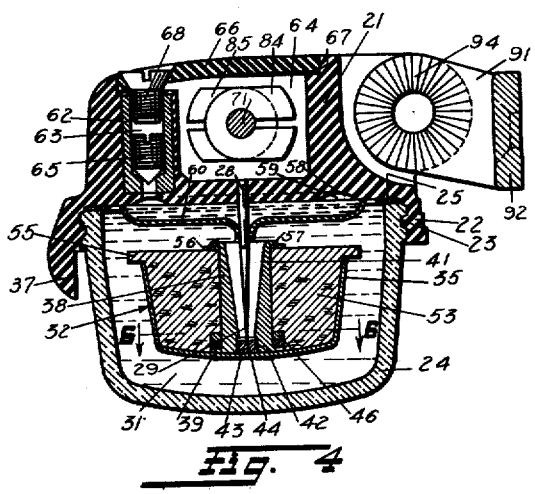
Figure 4 is a view in section taken substantially along the line 4—4 of Figure 1.
Figure 2:
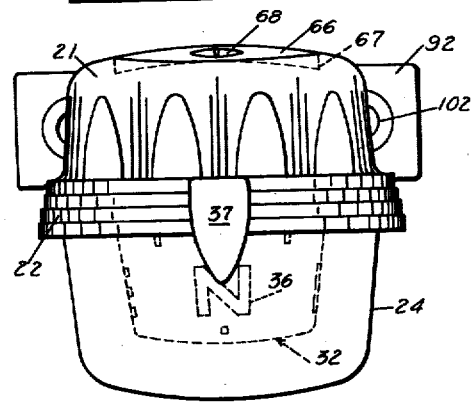
Figure 2 is a front elevational view of the construction shown in Figure 1.
Figure 3:
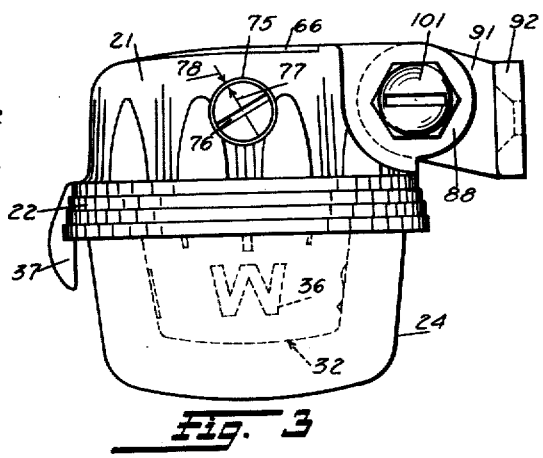
Figure 3 is an elevational view of the construction of Figure 2 when viewed from the right side thereof.

Figures 9 and 10 illustrate alternate arrangements of the cork filler forming a part of the dial cup assembly. In Figure 9 the rim of dial cup 35 is formed flush with the top surface of cork filler 53 as seen at 111 to eliminate the lateral flange shown at 55 in Figures 4 and 5.

Figure 10 illustrates a cork filler having a lateral flange 112 provided with a depending annular portion 113 spaced from dial cup 35 as indicated at 114.

In Figures 11 and 12 are shown alternate arrangements of the pivot pin upon which the dial assembly rotates, in which the dial assembly is adapted to be supported from below. Figure 11 illustrates a hook-shaped pivot pin 116 depending from one side of housing section 21 and bent upward centrally of bowl 24' as indicated at 117. Dial assembly 118 which is generally similar to the dial float assembly 32 of the preferred form of my invention, embodies a dial cup 119 having a core member 121 one end of which is accommodated in an aperture in the bottom of the dial cup and the other end of which supports a bearing member 122. A magnet 123 is mounted upon core 121 adjacent the bottom of the dial cup. It will be seen that the dial assembly is thus designed to rest by gravity upon pivot pin 116 and the need for a liquid bath to float the dial cup is thus eliminated together with the need for a cork filler within the dial cup.

Figure 12 illustrates a pivot pin 124 extending upwardly from a mounting lug 125 provided in the bottom of bowl 24'. The dial assembly is similar to that of Figure 11 and is adapted to rest by gravity upon the pivot pin.

Figure 13 illustrates dual compensating magnets 126 and 127 adjustably mounted upon bolts 128 and 129 which are rotatably mounted within housing section 21 at right angles to each other and which may be individually selectively adjusted from the exterior of the housing section. Compensating magnet 129 is spaced from the wall of the compensating chamber by a bridge member 131. By such construction of the compensating magnets, the compass may be mounted at any point within a vehicle and accurately adjusted to compensate for stray magnetic fields existing at such point.

It will thus be seen that the present invention provides an automobile compass which may readily be regulated by unskilled persons to compensate for inaccurate registration, which is simple and unitary in construction and which is efficient and reliable in operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a magnetic compass, a casing comprising a supporting section and a bowl portion provided with transparent walls depending from and supported by said section, a pivot mounted on said supporting section and depending into said bowl portion, an element including a magnet buoyantly rotatably supported against the end of said pivot, an indicia carrier mounted on said element and having indicia displayed thru said transparent walls, said supporting section being hollow to provide a chamber directly above and adjacent to said element, and compensating means mounted in said chamber comprising a shaft rotatable from the exterior of said casing and a plurality of magnets independently adjustable on said shaft.

2. In a magnetic compass, a housing, a transparent bowl removably depending from said housing, a pivot depending from said housing into said bowl, a liquid bath contained in said bowl, a dial float including a permanent magnet buoyantly supported in said bath against said pivot, a compensating assembly disposed in a chamber in said housing including a threaded bolt mounted for rotation in said housing and adjustable from the exterior thereof, dual compensating magnets adjustably mounted on said bolt within said chamber, lock nuts mounted on said bolt adjacent said magnets for retaining said magnets in adjusted position on said bolt, and a resilient member mounted on said bolt adjacent a wall of said chamber for maintaining said bolt in a definite position with respect to said housing section.

3. In a magnetic compass, a bowl, an element mounted in said bowl for movement in response to the earth's magnetic field and bearing indicia displayed through said bowl, a housing secured to said bowl, a compensator comprising a shaft journalled in said housing and having an end projecting outside said housing, horseshoe magnets disposed within a chamber in said housing and threaded on said shaft with their open ends in diametric opposition, and an index on the exposed end of said shaft designed to register with respect to said housing for indicating a known angular disposition of said magnets.

4. In a magnetic compass, a housing section, a transparent bowl detachably threaded to said section, a needle pivot depending from said section into said bowl, a liquid bath contained within said bowl, a dial float assembly immersed in said bath and buoyantly supported for rotation against said pivot comprising a cup bearing external indicia and a permanent magnet mounted within said cup, an index formed on said housing section and designed for registration with said cup indicia, a manually adjustable bolt extending through a chamber in said housing section, a magnetic element mounted on said bolt within said chamber, a removable cover for enclosing said chamber, there being a bore in said housing interconnecting the interior of said bowl with the exterior of said housing section and a bracket adjustably secured to said housing section.

5. In a magnetic compass, a casing including a main housing section and a transparent bowl depending from said housing section, an indicator assembly including a magnet disposed within said bowl, a hook-shaped pivot depending from a side of said housing section into said bowl and bent upwardly adjacent the center of said bowl for rotatably supporting said indicator element with respect to said casing, a chamber in said housing section, and compensating means adjustably mounted in said chamber, and means for adjusting said compensating means from the exterior of said housing section.

6. In a magnetic compass a casing including a hollow main housing and supporting section and a transparent bowl supported by and depending from said housing section, an indicator assembly including a magnet disposed within said bowl, a pivot mounted in the bottom of said bowl and extending centrally upward for rotatably supporting said indicator assembly with respect to said casing, and compensating means adjustably mounted within said hollow housing section directly above said indicator assembly.

7. In a magnetic compass a casing provided with a chamber, a pivot mounted in said casing and depending into said chamber, a buoyant liquid substantially filling said chamber, a magnetic indicator dial in said chamber buoyantly urged by said liquid into contact with the end of said pivot, means in said casing to receive an air bubble above said liquid for expansion thereof, and a baffle plate mounted on said pivot and extending into contact with said casing adjacent to said means for partially enclosing said air bubble.

8. In a magnetic compass a casing having a chamber, a liquid bath filling said chamber, a pivot mounted in said casing and depending into said chamber, and a buoyant magnetic direction indicator supported by said liquid against the end of said pivot for movement under the influence of the earth's magnetic field comprising a cup-shaped element, a core axially disposed within said element and secured at one end to the bottom of said cup, said core having an axial bore enlarged adjacent the bottom of said cup, an anti-friction element retained within said enlarged bore portion for bearing against said pivot, a magnet disposed within said cup, and a buoyant element substantially filling the space in said cup around said core and magnet.

9. The structure defined in claim 8 wherein said buoyant element filling said cup is provided with a flange portion extending beyond the rim of said cup for dampening excessive oscillation of said cup in said liquid bath.

10. In a compass, a casing, a chamber in said casing, a bowl depending from said casing and providing a second chamber, a liquid bath filling said second chamber, a magnetic direction indicator rotatably mounted in said liquid bath, said casing being provided with a bore extending between said chambers, a closure element for said bore, a cover for said first named chamber overlying said bore, and means for securing said cover in place, said means engaging said bore and covering said closure element.

11. In a magnetic compass, a casing, mounting means for said casing, a chamber in said casing provided with a removable closure element, a transparent bowl carried by and depending from said casing, an indicator assembly mounted within said bowl and including a magnet, magnetic compensating means positioned in said chamber in close proximity to said indicator assembly, said compensating means including a rotatable shaft extending within said chamber from the exterior of said casing, and a plurality of magnetic compensating devices mounted on said shaft, said devices being independently adjustable on said shaft upon removal of said closure element.

MAXIMILIAN KLEIN.
BERNHARD WILLACH.
WILLIAM STADER.

CERTIFICATE OF CORRECTION.

Patent No. 2,132,168.   October 4, 1938.

MAXIMILIAN KLEIN, ET AL.

It is hereby certified that error appears in the printed specification of the above numbered patent requiring correction as follows: Page 4, second column, line 36, claim 2, before the word "position" insert axial; and that the said Letters Patent should be read with this correction therein that the same may conform to the record of the case in the Patent Office.

Signed and sealed this 15th day of November, A. D. 1938.

Henry Van Arsdale

Acting Commissioner of Patents.

(Seal)

rotatably supporting said indicator element with respect to said casing, a chamber in said housing section, and compensating means adjustably mounted in said chamber, and means for adjusting said compensating means from the exterior of said housing section.

6. In a magnetic compass a casing including a hollow main housing and supporting section and a transparent bowl supported by and depending from said housing section, an indicator assembly including a magnet disposed within said bowl, a pivot mounted in the bottom of said bowl and extending centrally upward for rotatably supporting said indicator assembly with respect to said casing, and compensating means adjustably mounted within said hollow housing section directly above said indicator assembly.

7. In a magnetic compass a casing provided with a chamber, a pivot mounted in said casing and depending into said chamber, a buoyant liquid substantially filling said chamber, a magnetic indicator dial in said chamber buoyantly urged by said liquid into contact with the end of said pivot, means in said casing to receive an air bubble above said liquid for expansion thereof, and a baffle plate mounted on said pivot and extending into contact with said casing adjacent to said means for partially enclosing said air bubble.

8. In a magnetic compass a casing having a chamber, a liquid bath filling said chamber, a pivot mounted in said casing and depending into said chamber, and a buoyant magnetic direction indicator supported by said liquid against the end of said pivot for movement under the influence of the earth's magnetic field comprising a cup-shaped element, a core axially disposed within said element and secured at one end to the bottom of said cup, said core having an axial bore enlarged adjacent the bottom of said cup, an anti-friction element retained within said enlarged bore portion for bearing against said pivot, a magnet disposed within said cup, and a buoyant element substantially filling the space in said cup around said core and magnet.

9. The structure defined in claim 8 wherein said buoyant element filling said cup is provided with a flange portion extending beyond the rim of said cup for dampening excessive oscillation of said cup in said liquid bath.

10. In a compass, a casing, a chamber in said casing, a bowl depending from said casing and providing a second chamber, a liquid bath filling said second chamber, a magnetic direction indicator rotatably mounted in said liquid bath, said casing being provided with a bore extending between said chambers, a closure element for said bore, a cover for said first named chamber overlying said bore, and means for securing said cover in place, said means engaging said bore and covering said closure element.

11. In a magnetic compass, a casing, mounting means for said casing, a chamber in said casing provided with a removable closure element, a transparent bowl carried by and depending from said casing, an indicator assembly mounted within said bowl and including a magnet, magnetic compensating means positioned in said chamber in close proximity to said indicator assembly, said compensating means including a rotatable shaft extending within said chamber from the exterior of said casing, and a plurality of magnetic compensating devices mounted on said shaft, said devices being independently adjustable on said shaft upon removal of said closure element.

MAXIMILIAN KLEIN.
BERNHARD WILLACH.
WILLIAM STADER.

CERTIFICATE OF CORRECTION.

Patent No. 2,132,168.
October 4, 1938.

MAXIMILIAN KLEIN, ET AL.

It is hereby certified that error appears in the printed specification of the above numbered patent requiring correction as follows: Page 4, second column, line 36, claim 2, before the word "position" insert axial; and that the said Letters Patent should be read with this correction therein that the same may conform to the record of the case in the Patent Office.

Signed and sealed this 15th day of November, A. D. 1938.

Henry Van Arsdale

Acting Commissioner of Patents.

(Seal)